United States Patent
Peng et al.

(10) Patent No.: US 8,879,660 B1
(45) Date of Patent: Nov. 4, 2014

(54) ANTIPODAL DEMODULATION METHOD AND ANTIPODAL DEMODULATOR FOR NON-COHERENT UNITARY SPACE-TIME MODULATION IN MIMO WIRELESS COMMUNICATION

(71) Applicant: Hua Zhong University of Science and Technology, Hubei (CN)

(72) Inventors: Li Peng, Hubei (CN); Dawei Fu, Hubei (CN)

(73) Assignee: Huazhong University of Science and Technology, Wuhan, Hubei (CN)

( * ) Notice: Subject to any disclaimer, the term of this patent is extended or adjusted under 35 U.S.C. 154(b) by 0 days.

(21) Appl. No.: 14/086,325

(22) Filed: Nov. 21, 2013

(30) Foreign Application Priority Data

Sep. 10, 2013 (CN) .......................... 2013 1 0409889

(51) Int. Cl.
| H04B 7/02 | (2006.01) |
| H04L 1/02 | (2006.01) |
| H04B 7/08 | (2006.01) |
| H04L 1/06 | (2006.01) |
| H04B 7/04 | (2006.01) |

(52) U.S. Cl.
CPC ............ *H04B 7/0897* (2013.01); *H04L 1/0612* (2013.01); *H04B 7/0413* (2013.01)
USPC .............................. 375/267; 375/259; 375/260

(58) Field of Classification Search
USPC ........................................................ 375/267
See application file for complete search history.

(56) References Cited

U.S. PATENT DOCUMENTS

| 7,817,745 | B2 * | 10/2010 | Cioffi et al. .................... 375/296 |
| 2005/0084040 | A1 * | 4/2005 | Stewart et al. ................. 375/324 |
| 2008/0298531 | A1 * | 12/2008 | Troulis et al. ................. 375/371 |
| 2010/0046603 | A1 * | 2/2010 | McLaughlin ................. 375/239 |
| 2011/0255623 | A1 * | 10/2011 | Golitschek Edler Von Elbwart et al. ............................. 375/261 |

* cited by examiner

*Primary Examiner* — Erin File
(74) *Attorney, Agent, or Firm* — Hamre, Schumann, Mueller & Larson, P.C.

(57) ABSTRACT

Provided is an antipodal demodulation method and an antipodal demodulator for non-coherent unitary space-time modulation in MIMO wireless communication. The invention comprises: traversing L/2 constellation points in each sub-constellation of a non-coherent unitary space-time diagram for maximum likelihood demodulation calculation, determining a maximum trace $\psi_{max}$ and a minimum trace $\psi_{min}$ from traces of L/2 matrix products, calculating a maximum trace $\overline{\psi}_{max}$ of a matrix product corresponding to the constellation matrix in the other sub-constellation according to $\overline{\psi}_{max} = tr(Y^H \overline{\Phi}_j \overline{\Phi}_h^H Y) = tr(Y^H Y) - tr(Y^H \Phi_j \Phi_j^H Y) = \sigma - \psi_{min}$, and outputting a constellation point corresponding to the greater one of $\psi_{max}$ and $\overline{\psi}_{max}$ as a demodulation signal. The antipodal demodulation method of the invention reduces calculation workload by ½ and features lower calculation complexity over the conventional maximum likelihood demodulation method without degrading demodulation performance.

7 Claims, 1 Drawing Sheet

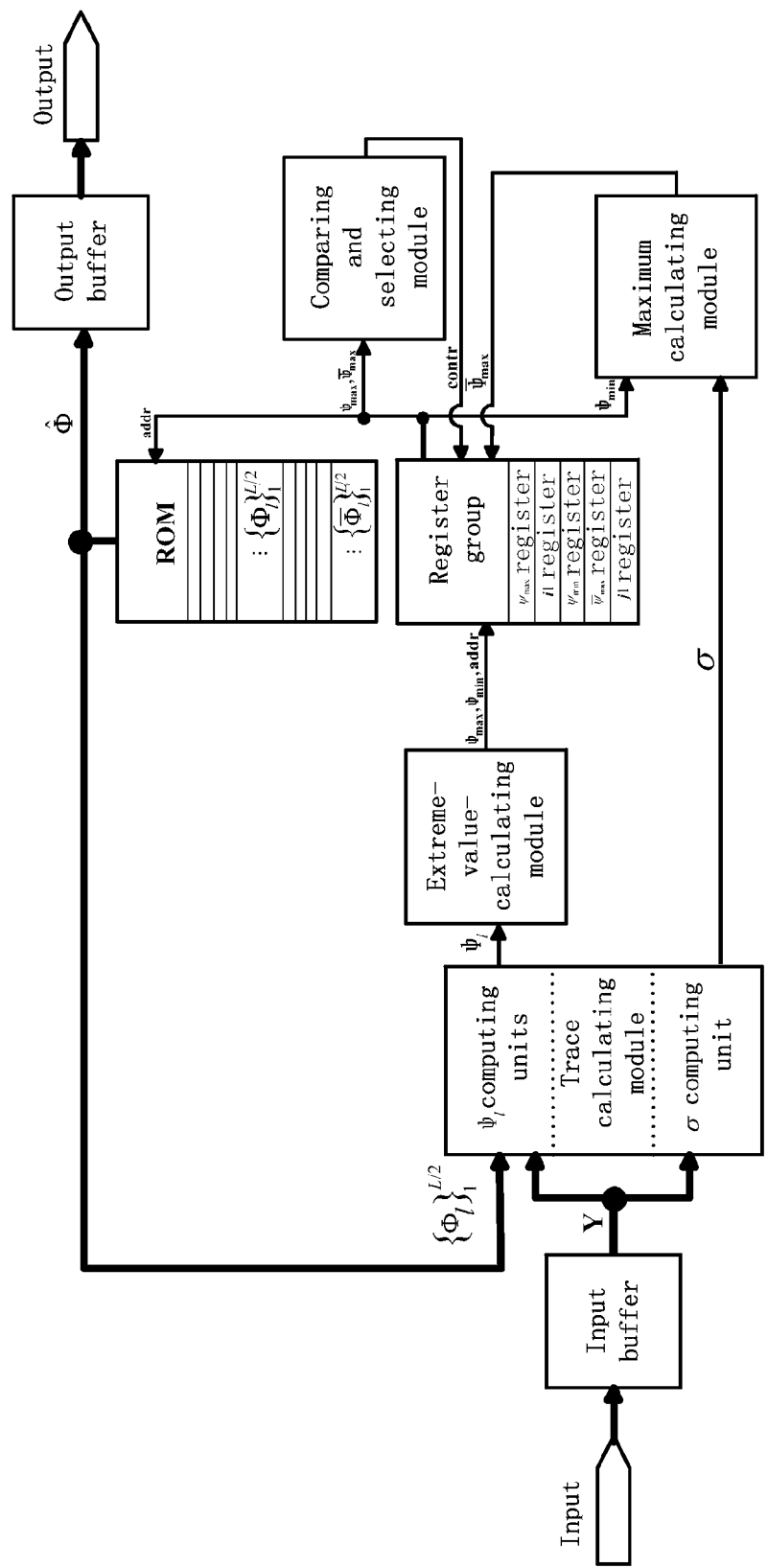

ANTIPODAL DEMODULATION METHOD AND ANTIPODAL DEMODULATOR FOR NON-COHERENT UNITARY SPACE-TIME MODULATION IN MIMO WIRELESS COMMUNICATION

CROSS-REFERENCE TO RELATED APPLICATIONS

Pursuant to 35 U.S.C. §119 and the Paris Convention Treaty, this application claims the benefit of Chinese Patent Application No. 201310409889.4 filed on Sep. 10, 2013, the contents of which are incorporated herein by reference.

FIELD

The invention relates to the communication technology field, and more particularly to an antipodal demodulation method and an antipodal demodulator for non-coherent unitary space-time modulation in MIMO wireless communication.

BACKGROUND

With fast development of wireless communication, it has become a core problem for next generation wireless communication systems to increase data transmission speeds without degrading the quality of service (QoS). Since Telatar found that multiple-input multiple-output (MIMO) systems are capable of linearly increasing channel capacity in 1995, research fever on wireless MIMO communication systems has been activated, and the MIMO technology has become a key technology in the next generation wireless communication systems. In addition, space-time codes are one of the main transmission technologies for long-term evolution (LTE) of the third-generation (3G) communication.

The MIMO communication system is divided into a coherent communication system and a non-coherent communication system based on requirement for channel estimation during demodulation. The non-coherent space-time code is divided into a differential space-time code and a unitary space-time code, and this invention is aimed at the unitary space-time code since there is very little research achievement for non-coherent unitary space-time demodulation methods. At present, experimental simulation platforms for designing the non-coherent space-time code mainly use a maximum likelihood algorithm as a demodulation algorithm. Maximum likelihood demodulation comprises calculating likelihood probabilities of all constellation points, and selecting a constellation point with the greatest likelihood probability as an output signal of a demodulator. However, a problem with the demodulation method traversing all the constellation points is that, calculation workload and complexity linearly increase as a constellation becomes larger.

SUMMARY

It is an objective of the invention to provide an antipodal demodulation method for non-coherent unitary space-time modulation in MIMO wireless communication, the method finds an antipodal structure of a high-performance unitary space-time constellation and relationship between different antipodes by analyzing conventional non-coherent unitary space-time diagrams, and features the same demodulation performance as a maximum likelihood demodulation method with the number of constellation points half of that thereof during a demodulation process.

Provided is an antipodal demodulation method for non-coherent unitary space-time modulation in MIMO wireless communication, comprising steps of:

(1) dividing an antipode-based unitary space-time constellation $$C_1 = \{\Phi_l\}_{l=1}^{L}$$

into two sub-constellation $$C_1 = \{\Phi_l\}_{l=1}^{L/2}$$

and $$\overline{C}_1 = \{\overline{\Phi}_l\}_{l=1}^{L/2},$$

where L represents the number of constellation points in the constellation, $\Phi_l$ and $\overline{\Phi}_l$ represents two T×M complex matrices, T represents a coherent time interval, M represents the number of transmission antennas, $\Phi_{\alpha\beta}$ and $\overline{\Phi}_{\alpha\beta}$ represents signals transmitted by the $\beta^{th}$ transmission antenna at time $\alpha$, there is no antipode pair in the sub-constellation, and there is one-to-one correspondence between two antipodes in different sub-constellations;

(2) obtaining traces of a matrix product of L/2 constellation matrices in the sub-constellation $$C_1 = \{\Phi_l\}_{l=1}^{L/2}$$

and a receiving signal matrix Y: $\psi_l = tr(Y^H \Phi_l \Phi_l^H Y)$, l=1,2, ... L/2, determining a maximum trace $\psi_{max}$ and a minimum trace $\psi_{min}$ therefrom, calculating the trace of a matrix product of said receiving signal matrix Y: $\sigma = tr(Y^H Y)$, and corresponding constellation matrices $\Phi_i$ and $\Phi_j$ in the sub-constellation $C_1 = \{\Phi_l\}_{l=1}^{L/2}$ according to the maximum trace $\psi_{max}$ and the minimum trace $\psi_{min}$, obtaining an antipode matrix $\overline{\Phi}_j$ antipodal to $\Phi_j$ in another sub-constellation $$\overline{C}_1 = \{\overline{\Phi}_l\}_{l=1}^{L/2}$$

according to relationship between the antipodes, calculating a maximum trace $\overline{\psi}_{max}$ of a matrix product corresponding to the other sub-constellation $$\overline{C}_1 = \{\overline{\Phi}_l\}_{l=1}^{L/2}$$

according to a relationship among the constellation matrices $\Phi_j$ and $\overline{\Phi}_j$ antipodal to each other, and the receiving signal matrix Y: $\overline{\psi}_{max} = \sigma - \psi_{min} = tr(Y^H \overline{\Phi}_j \overline{\Phi}_j^H Y) = tr(Y^H Y) - tr(Y^H \Phi_j \Phi_j^H Y)$, where the receiving signal matrix Y represents a T×N complex matrix, T represents a coherent time interval, N represents the number of receiving antennas, $y_{\alpha\gamma}$ represents a signal received by the $\gamma^{th}$ receiving antenna at the time $\alpha$, and tr($\square$) represents obtaining a trace of a matrix within the brackets; and (3) comparing the maximum trace $\psi_{max}$ and the maximum trace $\overline{\psi}_{max}$ corresponding to constellation points in the sub-constellations, determining a greater one therefrom, and selecting a constellation matrix corresponding thereto as a demodulation signal matrix, namely, selecting the transmission signal matrix $\Phi_i$ corresponding to $\psi_{max}$ from the sub-constellation $$\overline{C}_1 = \{\Phi_l\}_{l=1}^{L/2}$$

as a demodulated constellation matrix $\hat{\psi}=\Phi_i$ as $\psi_{max}>\overline{\psi}_{max}$, and selecting the transmission signal matrix $\overline{\Phi}_j$ corresponding to $\overline{\psi}_{max}$ from the sub-constellation $$\overline{C}_1 = \{\Phi_l\}_{l=1}^{L/2}$$

as a demodulated constellation matrix $\hat{\Phi}=\overline{\Phi}_j$ as $\psi_{max}<\overline{\psi}_{max}$.

The invention uses a method of dividing the antipodal sub-constellation: firstly, the non-coherent unitary space-time constellation is divided into two antipodal sub-constellations, there is no antipode pair in each sub-constellation, and there is one-to-one correspondence between two constellation points in different sub-constellations, then relationship between antipodal constellation points during the demodulation process is determined $tr(Y^H\Phi\Phi^HY)+tr(Y^H\overline{\Phi}\,\overline{\Phi}^HY)=tr(Y^HY)$, after that, the maximum value $\psi_{max}$ and the minimum value $\psi_{min}$ therefrom are determined by traversing all constellation points in (one of) the sub-constellation, then the maximum trace $\overline{\psi}_{max}$ of the matrix product corresponding to the other sub-constellation is derived according to $\overline{\psi}_{max}=tr(Y^HY)-\psi_{min}$, and finally, the constellation matrix corresponding to the greater one of $\psi_{max}$ and $\overline{\psi}_{max}$ is output as the demodulation signal. This method reduces calculation workload by ½ and features lower calculation complexity over the conventional maximum likelihood demodulation method without degrading demodulation performance Provided is an antipodal demodulator for non-coherent unitary space-time modulation in MIMO wireless communication, comprising an input buffer, a read-only memory module, a trace-calculating module, an extreme-value-calculating module, a register group, a maximum-calculating module, a comparing and selecting module, and an output buffer, the input buffer is configured to receive and save a receiving signal matrix Y, and to output the receiving signal matrix Y to the trace-calculating module, the receiving signal matrix Y representing a T×N complex matrix, and $y_{\alpha\gamma}$ representing a signal received by the $\gamma^{th}$ receiving antenna at time $\alpha$, the read-only memory module is configured to save all the constellation matrices of two sub-constellations $$C_1 = \{\Phi_l\}_{l=1}^{L/2}$$

and $$\overline{C}_1 = \{\overline{\Phi}_l\}_{l=1}^{L/2}$$

of an antipode-based unitary space-time constellation $$C = \{\Phi_l\}_{l=1}^{L},$$

where L represents the number of constellation points in the constellation, $\Phi_l$ and $\overline{\Phi}_l$ represents two T×M complex matrices, T represents a coherent time interval, and $\Phi_{\alpha\beta}$ and $\overline{\Phi}_{\alpha\beta}$ represents signals transmitted by the $\beta^{th}$ transmission antenna at the time $\alpha$, the trace-calculating module is configured to receive L/2 constellation matrices in the sub-constellation $$C_1 = \{\Phi_l\}_{l=1}^{L/2}$$

from the read-only memory module, and the receiving signal matrix Y from the input buffer, calculating traces $\psi_l=tr(Y^H\Phi_l\Phi_l^HY)$ and $\sigma=tr(Y^HY)$, and transmitting L/2 traces $\psi_l$ of the matrix $Y^H\Phi_l\Phi_l^HY$ to the extreme-value-calculating module, and the trace $\sigma$ of the matrix $Y^HY$ to the maximum-calculating module, where $1\leq l\leq L/2$, and $tr(\square)$ represents obtaining a trace of a matrix within the brackets, the extreme-value-calculating module is configured to compare the L/2 traces $\psi_l$ of the matrix $Y^H\Phi_l\Phi_l^HY$, and to save a maximum trace $\psi_{max}$ and a minimum trace $\psi_{min}$ thereof, an address i1 of a constellation matrix $\Phi_i$ corresponding to the maximum trace $\psi_{max}$ in the read-only memory module, and an address j1 of an antipode matrix $\overline{\Phi}_j$ corresponding to the minimum trace $\psi_{min}$ and antipodal to a constellation matrix $\Phi_j$ in another sub-constellation $$\overline{C}_1 = \{\overline{\Phi}_l\}_{l=1}^{L/2}$$

in the read-only memory module into the register group, where $1\leq l\leq L/2$, the maximum-calculating module is configured to receive the trace $\sigma$ of the matrix $Y^HY$ from the trace-calculating module, and the minimum trace $\psi_{min}$ from the register group, to calculate $\overline{\psi}_{max}=\sigma-\psi_{min}$, and to save $\overline{\psi}_{max}$ into the register group, the comparing and selecting module is configured to obtain $\psi_{max}$ and $\overline{\psi}_{max}$ from the register group, to compare $\psi_{max}$ with $\overline{\psi}_{max}$, and to output a control signal contr operating to control the register group, and an address of a constellation matrix corresponding to a greater one of $\psi_{max}$ and $\overline{\psi}_{max}$ in the read-only memory module to the read-only memory module, the register group is configured to save $\psi_{max}$, $\psi_{min}$, i1, and j1 from the extreme-value-calculating module, and $\overline{\psi}_{max}$ from the maximum-calculating module, and to output an address of a constellation matrix corresponding to the greater one of $\psi_{max}$ and $\overline{\psi}_{max}$ in the read-only memory module to the read-only memory module according to the control signal contr output by the comparing and selecting module, whereby controlling the read-only memory module to output a demodulated constellation matrix to the output buffer, and the output buffer is configured to receive and buffer the demodulated constellation matrix $\hat{\Phi}$ from the read-only memory module.

In a class of this embodiment, the read-only memory module is configured to save the two sub-constellations $$C_1 = \{\Phi_l\}_{l=1}^{L/2}$$

and $$\overline{C}_1 = \{\overline{\Phi}_l\}_{l=1}^{L/2}$$

of the antipode-based unitary space-time constellation, there is no antipode pair in each sub-constellation, and there is one-to-one correspondence between two antipodes in different sub-constellations, the read-only memory module is configured to output L/2 constellation matrices in the sub-constellation $$C_1 = \{\Phi_l\}_{l=1}^{L/2}$$

to the trace-calculating module, to receive the address from the register group indicating a corresponding constellation matrix in the read-only memory module is the demodulated constellation matrix $\hat{\Phi}$, and to output $\hat{\Phi}$ to the output buffer.

In a class of this embodiment, the extreme-value-calculating module is configured to receive L/2 traces $\psi_l$ of matrices $Y^H\Phi_l\Phi_l^H Y$ output by $\psi_l$ computing units in the trace-calculating module, to determine a maximum trace $\psi_{max}$ and a minimum trace $\psi_{min}$ therefrom, to output the maximum trace $\psi_{max}$ and the minimum trace $\psi_{min}$ to the register group, and to output the address i1 of the constellation matrix $\Phi_i$ corresponding to the maximum trace $\psi_{max}$ in the read-only memory module, and the address j1 of the antipode matrix $\overline{\Phi}_j$ corresponding to the minimum value $\psi_{min}$ and antipodal to the constellation matrix $\Phi_j$ in another sub-constellation $$\overline{C}_1 = \{\overline{\Phi}_l\}_{l=1}^{L/2}$$

in the read-only memory module into the register group, where $1 \le l \le L/2$;

In a class of this embodiment, the maximum-calculating module is configured to receive the trace σ of the matrix $Y^H Y$ from σ computing unit in the trace-calculating module, to obtain the minimum trace $\psi_{min}$ from the register group, to calculate $\overline{\psi}_{max} = \sigma - \psi_{min}$, and to output $\overline{\psi}_{max}$ to the register group.

In a class of this embodiment, the register group is configured to receive and to save $\psi_{max}$ and $\psi_{min}$ from the extreme-value-calculating module, and the address i1 of the constellation matrix $\Phi_i$ corresponding to the maximum trace $\psi_{max}$ in the read-only memory module, and the address j1 of the antipode matrix $\overline{\Phi}_j$ corresponding to the minimum value $\psi_{min}$ and antipodal to the constellation matrix $\Phi_j$ in another sub-constellation $$\overline{C}_1 = \{\overline{\Phi}_l\}_{l=1}^{L/2}$$

in the read-only memory module, to output $\psi_{min}$ to the maximum-calculating module, to receive and save $\overline{\psi}_{max}$ from the maximum-calculating module, and to output $\psi_{max}$ and $\overline{\psi}_{max}$ to the comparing and selecting module.

In a class of this embodiment, the comparing and selecting module is configured to compare $\psi_{max}$ with $\overline{\psi}_{max}$, and to output the control signal contr operating to control the register group to the register group so that the register group transmits the address i1 of the constellation matrix $\Phi_i$ corresponding to the maximum trace $\psi_{max}$ in the read-only memory module to the read-only memory module if $\psi_{max} > \overline{\psi}_{max}$, and transmits the address j1 of the constellation matrix $\overline{\Phi}_j$ corresponding to the maximum trace $\overline{\psi}_{max}$ in the read-only memory module to the read-only memory module if $\psi_{max} < \overline{\psi}_{max}$.

BRIEF DESCRIPTION OF THE ACCOMPANYING DRAWINGS

FIG. 1 is a block diagram of an antipodal demodulator for non-coherent unitary space-time modulation in MIMO wireless communication.

SPECIFIC EMBODIMENTS

For clear understanding of the objectives, features and advantages of the invention, detailed description of the invention will be given below in conjunction with accompanying drawings and specific embodiments. It should be noted that the embodiments are only meant to explain the invention, and not to limit the scope of the invention.

Principle of the method of the invention will be described below:

(1) Maximum Likelihood Demodulation

Assume a MIMO wireless communication system comprises M transmission antennas and N receiving antennas, a symbol transmission interval thereof is T, and channel fading coefficient is constant in a cycle T, and varies in different cycles. Assume Φ represents a T×M transmission signal unitary matrix and a transmission symbol, Y represents a T×N receiving signal matrix and a receiving symbol, H is a M×N channel fading coefficient matrix, and W is a T×N additive white Gaussian noise (AWGN) matrix, and all elements in H and W are independently and identically distributed random variables which obey the CN(0,1) distribution, wherein ρ represents a signal-noise ratio (SNR) at each receiving antenna, and a normalization coefficient $\sqrt{\rho/M}$ ensures an average signal-noise ratio of each receiving antenna is ρ. A Rayleigh fast flat-fading channel model is defined as:

$$Y = \sqrt{\frac{\rho T}{M}} \Phi H + W \qquad (1)$$

Assume $C = \{\Phi_l\}_{l=1}^L$ represents the non-coherent unitary space-time diagram, tr(•) represents calculating a trace of a matrix within the brackets, $(•)^H$ represents a complex conjugate transpose of a matrix or a vector, $p(Y|\Phi_l)$ represents a conditional probability of the receiving symbol Y as the transmission symbol is $\Phi_l$, $\hat{\Phi}$ represents a demodulated constellation matrix which is also the signal output matrix, arg max tr( ) represents calculating traces of all the constellation matrices and determining the maximum trace, and then obtaining the demodulated constellation matrix $\hat{\Phi}$ corresponding to the maximum trace, where $\psi_l$ represents a conditional probability or a trace of the matrix product $Y^H\Phi_l\Phi_l^H Y$. A maximum likelihood demodulation algorithm of the receiver without channel estimation is:

$$\hat{\Phi} = \underset{\Phi_l \in C}{\arg\max}\, p(Y|\Phi_l) = \underset{\Phi_l \in C}{\arg\max}\, tr(Y^H \Phi_l \Phi_l^H Y) \qquad (2)$$

Assume the trace of the matrix product $Y^H\Phi_l\Phi_l^H Y$ is:

$$\psi_l = tr(Y^H\Phi_l\Phi_l^H Y) \qquad (3)$$

where $1 \le l \le L$.

(2) Antipodal Constellation

Assume U, V represent two T×M matrices on the complex domain space (where T=2M)), $\Sigma_{U^HV}$ represents a diagonal matrix formed by singular values of a matrix $U^HV$, d(U, V) represents a Frobenius chord distance between U and V:

$$d(U,V) = \sqrt{2M - 2tr(\Sigma_{U^HV})} \quad (4)$$

Two points $\Phi_\alpha$ and $\Phi_\beta$ with the biggest Frobenius chord distance are defined as antipodes, and it is obvious that the Frobenius chord distance therebetween is $d(\Phi_\alpha, \Phi_\beta) = \sqrt{2M}$. The antipodal constellation is defined as follows: if the unitary space-time constellation comprises L/2 pairs of antipodes, this kind of constellation is referred to as the antipodal constellation.

(3) Relationship Between the Antipodal Constellation matrix and the Receiving Signal Matrix For the antipodal constellation, two constellation matrix $\Phi$ and $\overline{\Phi}$ antipodal to each other and the receiving signal matrix Y have the following relationship:

$$tr(Y^H\Phi\Phi^HY) + tr(Y^H\overline{\Phi}\overline{\Phi}^HY) = tr(Y^HY) \quad (5)$$

Assume $\sigma$ represents a trace of an autocorrelation matrix $Y^HY$ of the output matrix Y, then $$\sigma = tr(Y^HY) \quad (6)$$

Equation (5) can be proved as follows: Assume $\Phi=[\phi_1\ \phi_2\ \ldots\ \phi_M]$, $\overline{\Phi}=[\overline{\phi}_1\ \overline{\phi}_2\ \ldots\ \overline{\phi}_M]$, where $\Phi$ and $\overline{\Phi}$ are an antipode pair, $\phi_i$ and $\overline{\phi}_i$ are respectively T-dimensional column vectors of $\Phi$ and $\overline{\Phi}$. It can be seen from definition of the antipode that column vectors between $\Phi$ and $\overline{\Phi}$ are unit orthogonal to each other, namely $\phi_i \perp \overline{\phi}_i$, i=1,2, ..., M. Two matrices orthogonal to each other satisfy $$\Phi\Phi^H + \overline{\Phi}\overline{\Phi}^H = [\Phi\overline{\Phi}]\begin{bmatrix}\Phi^H \\ \overline{\Phi}^H\end{bmatrix} = I,$$

where I is a T×T unit matrix.

It can be deduced from the left part of equation (5) that:

$$tr(Y^H\Phi\Phi^HY) + tr(Y^H\overline{\Phi}\overline{\Phi}^HY) = tr(Y^H(\Phi\Phi^H + \overline{\Phi}\overline{\Phi}^H)Y) = tr(Y^HIY) = \sigma$$

(4) Antipodal Demodulation Method

An antipodal demodulation method for non-coherent unitary space-time modulation in MIMO wireless communication of the invention comprises steps of:

(1) dividing an antipode-based unitary space-time constellation $$C = \{\Phi_l\}_{l=1}^{L}$$

into two sub-constellation $$C_1 = \{\Phi_l\}_{l=1}^{L/2}$$

and $$\overline{C}_1 = \{\overline{\Phi}_l\}_{l=1}^{L/2},$$

there is no antipode pair in each sub-constellation, and there is one-to-one correspondence between two antipodes in different sub-constellations;

(2) using equation (3) to traverse and calculate traces of a product of L/2 constellation matrices in the sub-constellation $$C_1 = \{\Phi_l\}_{l=1}^{L/2}$$

and a receiving signal matrix Y: $\psi_l = tr(Y^H\Phi_l\Phi_l^HY)$, l=1,2, ... L/2, determining a maximum trace $\psi_{max}$ and a minimum trace $\psi_{min}$ therefrom, and corresponding constellation matrices $\Phi_i$ and $\Phi_j$ in the sub-constellation $$C_1 = \{\Phi_l\}_{l=1}^{L/2}$$

according to the maximum trace $\psi_{max}$ and the minimum trace $\psi_{min}$ respectively, obtaining an antipode matrix $\overline{\Phi}_j$ antipodal to $\Phi_j$ in another sub-constellation $$\overline{C}_1 = \{\overline{\Phi}_l\}_{l=1}^{L/2}$$

according to relationship between the antipodes, calculating a maximum trace $\overline{\psi}_{max}$ of a matrix product corresponding to the other sub-constellation $$\overline{C}_1 = \{\overline{\Phi}_l\}_{l=1}^{L/2}$$

according to a relationship among the constellation matrices $\Phi_j$ and $\overline{\Phi}_j$ antipodal to each other, and the receiving signal matrix Y:

$$\overline{\psi}_{max} = tr(Y^H\overline{\Phi}_j\overline{\Phi}_j^HY) = tr(Y^HY) - tr(Y^H\Phi_j\Phi_j^HY) = \sigma - \psi_{min} \quad (7);$$

and (3) comparing the maximum trace $\psi_{max}$ and the maximum trace $\overline{\psi}_{max}$ corresponding to constellation points in the sub-constellations, determining a greater one therefrom, and selecting a constellation matrix corresponding thereto as a demodulation signal matrix, namely, selecting the transmission signal matrix $\Phi_i$ corresponding to $\psi_{max}$ from the sub-constellation $$C_1 = \{\Phi_l\}_{l=1}^{L/2}$$

as a demodulated constellation matrix $\hat{\Phi} = \Phi_i$ as $\psi_{max} > \overline{\psi}_{max}$, and selecting the transmission signal matrix $\overline{\Phi}_j$ corresponding to $\overline{\psi}_{max}$ from the sub-constellation $$\overline{C}_1 = \{\overline{\Phi}_l\}_{l=1}^{L/2}$$

as a demodulated constellation matrix $\hat{\Phi} = \overline{\Phi}_j$ as $\psi_{max} < \overline{\psi}_{max}$.

So far, a maximum likelihood demodulation method traversing L constellation points is converted to an optimized maximum likelihood demodulation method traversing L/2 constellation points.

Based on the above-mentioned antipodal demodulation method, an antipodal demodulator for non-coherent unitary space-time modulation in MIMO wireless communication is provided for performing optimized maximum likelihood demodulation on the antipode-based non-coherent unitary space-time code, as shown in FIG. 1, the demodulator comprises an input buffer, a read-only memory module, a trace-calculating module, an extreme-value-calculating module, a register group, a maximum-calculating module, a comparing and selecting module, and an output buffer.

The input buffer is configured to receive and save a receiving signal matrix Y, and to output the receiving signal matrix Y to the trace-calculating module, the receiving signal matrix Y representing a T×N complex matrix, and $y_{\alpha\gamma}$ representing a signal received by the $\gamma^{th}$ receiving antenna at time $\alpha$, the read-only memory module is configured to save all the constellation matrices of two sub-constellation $C_1 = \{\Phi_l\}_{l=1}^{L/2}$ and $\overline{C}_1 = \{\overline{\Phi}_l\}_{l=1}^{L/2}$ of an antipode-based unitary space-time constellation $$C = \{\Phi_l\}_{l=1}^{L},$$

where L represents the number of constellation points in the constellation, $\Phi_i$ and $\overline{\Phi}_i$ represents two T×M complex matrices, T represents a coherent time interval, and $\Phi_{\alpha\beta}$ and $\overline{\Phi}_{\alpha\beta}$ represents signals transmitted by the $\beta^{th}$ transmission antenna at the time $\alpha$, the trace-calculating module is configured to receive L/2 constellation matrices in the sub-constellation $$C_1 = \{\Phi_l\}_{l=1}^{L/2}$$

from the read-only memory module, and the receiving signal matrix Y from the input buffer, calculating traces $\psi_l = tr(Y^H \Phi_l \Phi_l^H Y)$ and $\sigma = tr(Y^H Y)$, and transmitting L/2 traces $\psi_l$ of the matrix $Y^H \Phi_l \Phi_l^H Y$ to the extreme-value-calculating module, and the trace $\sigma$ of the matrix $Y^H Y$ to the maximum-calculating module, where $1 \leq l \leq L/2$, and tr($\square$) represents obtaining a trace of a matrix within the brackets, the extreme-value-calculating module is configured to compare the L/2 traces $\psi_l$ of the matrix $Y^H \Phi_l \Phi_l^H Y$, and to save a maximum trace $\psi_{max}$ and a minimum trace $\psi_{min}$ thereof, an address i1 of a constellation matrix $\Phi_i$ corresponding to the maximum trace $\psi_{max}$ in the read-only memory module, and an address j1 of an antipode matrix $\overline{\Phi}_j$ corresponding to the minimum trace $\psi_{min}$ and antipodal to a constellation matrix $\Phi_j$ in another sub-constellation $$\overline{C}_1 = \{\overline{\Phi}_l\}_{l=1}^{L/2}$$

in the read-only memory module into the register group, where $1 \leq l \leq L/2$, the maximum-calculating module is configured to receive the trace $\sigma$ of the matrix $Y^H Y$ from the trace-calculating module, and the minimum trace $\psi_{min}$ from the register group, to calculate $\overline{\psi}_{max} = \sigma - \psi_{min}$, and to save $\overline{\psi}_{max}$ into the register group, the comparing and selecting module is configured to obtain $\psi_{max}$ and $\overline{\psi}_{max}$ from the register group, to compare $\psi_{max}$ with $\overline{\psi}_{max}$, and to output a control signal contr operating to control the register group, and an address of a constellation matrix corresponding to a greater one of $\psi_{max}$ and $\overline{\psi}_{max}$ in the read-only memory module to the read-only memory module, the register group is configured to save $\psi_{max}$, $\psi_{min}$, i1, and j1 from the extreme-value-calculating module, and $\overline{\psi}_{max}$ from the maximum-calculating module, and to output an address of a constellation matrix corresponding to the greater one of $\psi_{max}$ and $\overline{\psi}_{max}$ in the read-only memory module to the read-only memory module according to the control signal contr output by the comparing and selecting module, whereby controlling the read-only memory module to output a demodulated constellation matrix to the output buffer, and the output buffer is configured to receive and buffer the demodulated constellation matrix $\hat{\Phi}$ from the read-only memory module.

The read-only memory module is configured to save the two sub-constellation $$C_1 = \{\Phi_l\}_{l=1}^{L/2}$$

and $$\overline{C}_1 = \{\overline{\Phi}_l\}_{l=1}^{L/2}$$

of the antipode-based unitary space-time constellation, there is no antipode pair in each sub-constellation, and there is one-to-one correspondence between two antipodes in different sub-constellations, the read-only memory module is configured to output L/2 constellation matrices in the sub-constellation $$C_1 = \{\Phi_l\}_{l=1}^{L/2}$$

to the trace-calculating module, to receive the address from the register group indicating a corresponding constellation matrix in the read-only memory module is the demodulated constellation matrix $\hat{\Phi}$, and to output $\hat{\Phi}$ to the output buffer.

The extreme-value-calculating module is configured to receive L/2 traces $\psi_l$ of matrices $Y^H \Phi_l \Phi_l^H Y$ output by $\psi_l$ computing units in the trace-calculating module, to determine a maximum trace $\psi_{max}$ and a minimum trace $\psi_{min}$ therefrom, to output the maximum trace $\psi_{max}$ and the minimum trace $\psi_{min}$ to the register group, and to output the address i1 of the constellation matrix $\Phi_i$ corresponding to the maximum trace $\psi_{max}$ in the read-only memory module, and the address j1 of the antipode matrix $\overline{\Phi}_j$ corresponding to the minimum value $\psi_{min}$ and antipodal to the constellation matrix $\Phi_j$ in another sub-constellation $$\overline{C}_1 = \{\overline{\Phi}_l\}_{l=1}^{L/2}$$

in the read-only memory module into the register group, where $1 \leq l \leq L/2$;

The maximum-calculating module is configured to receive the trace a of the matrix $Y^H Y$ from $\sigma$ computing unit in the trace-calculating module, to obtain the minimum trace $\psi_{min}$ from the register group, to calculate $\overline{\psi}_{max} = \sigma - \psi_{min}$, and to output $\overline{\psi}_{max}$ to the register group.

The register group is configured to receive and to save $\psi_{max}$ and $\psi_{min}$ from the extreme-value-calculating module, and the address i1 of the constellation matrix $\Phi_i$ corresponding to the maximum trace $\psi_{max}$ in the read-only memory module, and the address j1 of the antipode matrix $\overline{\Phi}_j$ corresponding to the minimum value $\psi_{min}$ and antipodal to the constellation matrix $\Phi_j$ in another sub-constellation $$\overline{C}_1 = \{\overline{\Phi}_l\}_{l=1}^{L/2}$$

in the read-only memory module, to output $\psi_{min}$ to the maximum-calculating module, to receive and save $\overline{\psi}_{max}$ from the maximum-calculating module, and to output $\psi_{max}$ and $\overline{\psi}_{max}$ to the comparing and selecting module.

The comparing and selecting module is configured to compare $\psi_{max}$ with $\overline{\psi}_{max}$, and to output the control signal contr operating to control the register group to the register group so that the register group transmits the address i1 of the constellation matrix $\Phi_i$ corresponding to the maximum trace $\psi_{max}$ in the read-only memory module to the read-only memory module if $\psi_{max} > \overline{\psi}_{max}$, and transmits the address j1 of the constellation matrix $\overline{\Phi}_j$ corresponding to the maximum trace $\overline{\psi}_{max}$ in the read-only memory module to the read-only memory module if $\psi_{max} < \overline{\psi}_{max}$.

While preferred embodiments of the invention have been described above, the invention is not limited to disclosure in the embodiments and the accompanying drawings. Any changes or modifications without departing from the spirit of the invention fall within the scope of the invention.

What is claimed is:

1. An antipodal demodulation method for non-coherent unitary space-time modulation in MIMO wireless communication, comprising steps of:
    (1) dividing an antipode-based unitary space-time constellation $$C = \{\Phi_l\}_{l=1}^{L}$$

into two sub-constellations $$C_1 = \{\Phi_l\}_{l=1}^{L/2}$$

and $$\overline{C}_1 = \{\overline{\Phi}_l\}_{l=1}^{L/2}$$

and where L represents the number of constellation points in said constellation, $\Phi_l$ and $\overline{\Phi}_l$ represents two T×M complex matrices, T represents a coherent time interval, M represents the number of transmission antennas, $\Phi_{\alpha\beta}$ and $\overline{\Phi}_{\alpha\beta}$ represents signals transmitted by the $\beta^{th}$ transmission antenna at time $\alpha$, there is no antipode pair in the sub-constellation, and there is one-to-one correspondence between two antipodes in different sub-constellations;
    (2) obtaining traces of a matrix product of L/2 constellation matrices in said sub-constellation $C_1 = \{\Phi_l\}_{l=1}^{L/2}$ and a receiving signal matrix Y: $\psi_l = tr(Y^H \Phi_l \Phi_l^H Y)$, l=1,2,... L/2, determining a maximum trace $\psi_{max}$ and a minimum trace $\psi_{min}$ therefrom, calculating the trace of a matrix product of said receiving signal matrix Y: $\sigma = tr(Y^H Y)$, and corresponding constellation matrices $\Phi_i$ and $\Phi_j$ in said sub-constellation $$C_1 = \{\Phi_l\}_{l=1}^{L/2}$$

according to said maximum trace $\psi_{max}$ and said minimum trace $\psi_{min}$, obtaining an antipode matrix $\overline{\Phi}_j$ antipodal to $\Phi_j$ in another sub-constellation $$\overline{C}_1 = \{\overline{\Phi}_l\}_{l=1}^{L/2}$$

according to relationship between said antipodes, calculating a maximum trace $\overline{\psi}_{max}$ of a matrix product corresponding to the other sub-constellation $$\overline{C}_1 = \{\overline{\Phi}_l\}_{l=1}^{L/2}$$

according to a relationship among said constellation matrices $\Phi_j$ and $\overline{\Phi}_j$ antipodal to each other, and said receiving signal matrix Y: $\overline{\psi}_{max} = \sigma - \psi_{min} = tr(Y^H \overline{\Phi}_j \overline{\Phi}_j^H Y) = tr(Y^H Y) - tr(Y^H \Phi_j \Phi_j^H Y)$, where said receiving signal matrix Y represents a T×N complex matrix, T represents a coherent time interval, N represents the number of receiving antennas, $y_{\alpha\gamma}$ represents a signal received by the $\gamma^{th}$ receiving antenna at said time $\alpha$, and tr($\square$) represents obtaining a trace of a matrix within the brackets; and
    (3) comparing said maximum trace $\psi_{max}$ and said maximum trace $\overline{\psi}_{max}$ corresponding to constellation points in said sub-constellations, determining a greater one therefrom, and selecting a constellation matrix corresponding thereto as a demodulation signal matrix, namely, selecting said transmission signal matrix $\Phi_i$ corresponding to $\psi_{max}$ from said sub-constellation $$C_1 = \{\Phi_l\}_{l=1}^{L/2}$$

as a demodulated constellation matrix $\hat{\psi} = \Phi_i$ as $\psi_{max} > \overline{\psi}_{max}$, and selecting said transmission signal matrix $\overline{\Phi}_j$ corresponding to $\overline{\psi}_{max}$ from said sub-constellation $$\overline{C}_1 = \{\overline{\Phi}_l\}_{l=1}^{L/2}$$

as a demodulated constellation matrix $\hat{\Phi} = \overline{\Phi}_j$ as $\psi_{max} < \overline{\psi}_{max}$.

2. An antipodal demodulator for non-coherent unitary space-time modulation in MIMO wireless communication, comprising an input buffer, a read-only memory module, a trace-calculating module, an extreme-value-calculating module, a register group, a maximum-calculating module, a comparing and selecting module, and an output buffer, wherein
    said input buffer is configured to receive and save a receiving signal matrix Y, and to output said receiving signal matrix Y to said trace-calculating module, said receiving signal matrix Y representing a T×N complex matrix, and $y_{\alpha\gamma}$ representing a signal received by the $\gamma^{th}$ receiving antenna at time $\alpha$;
    said read-only memory module is configured to save all the constellation matrices of two sub-constellations $$C_1 = \{\Phi_l\}_{l=1}^{L/2}$$

and $$\overline{C}_1 = \{\overline{\Phi}_l\}_{l=1}^{L/2}$$

of an antipode-based unitary space-time constellation $$C = \{\Phi_l\}_{l=1}^{L},$$

where L represents the number of constellation points in said constellation, $\Phi_l$ and $\overline{\Phi}_l$ represents two T×M complex matrices, T represents a coherent time interval, and $\Phi_{\alpha\beta}$ and $\overline{\Phi}_{\alpha\beta}$ represents signals transmitted by the $\beta^{th}$ transmission antenna at said time $\alpha$;

said trace-calculating module is configured to receive L/2 constellation matrices in said sub-constellation $$C_1 = \{\Phi_l\}_{l=1}^{L/2}$$

from said read-only memory module, and said receiving signal matrix Y from said input buffer, calculating traces $\psi_l = \text{tr}(Y^H \Phi_l \Phi_l^H Y)$ and $\sigma = \text{tr}(Y^H Y)$, and transmitting L/2 traces $\psi_l$ of said matrix $Y^H \Phi_l \Phi_l^H Y$ to said extreme-value-calculating module, and said trace $\sigma$ of said matrix $Y^H Y$ to said maximum-calculating module, where $1 \le l \le L/2$, and $\text{tr}(\square)$ represents obtaining a trace of a matrix within the brackets;

said extreme-value-calculating module is configured to compare said L/2 traces $\psi_l$ of said matrix $Y^H \Phi_l \Phi_l^H Y$, and to save a maximum trace $\psi_{max}$ and a minimum trace $\psi_{min}$ thereof, an address i1 of a constellation matrix $\Phi_i$ corresponding to said maximum trace $\psi_{max}$ in said read-only memory module, and an address j1 of an antipode matrix $\overline{\Phi}_j$ corresponding to said minimum trace $\psi_{min}$ and antipodal to a constellation matrix $\Phi_j$ in another sub-constellation $$\overline{C}_1 = \{\overline{\Phi}_l\}_{l=1}^{L/2}$$

in said read-only memory module into said register group, where $1 \le l \le L/2$;

said maximum-calculating module is configured to receive said trace $\sigma$ of said matrix $Y^H Y$ from said trace-calculating module, and said minimum trace $\psi_{min}$ from said register group, to calculate $\overline{\psi}_{max} = \sigma - \psi_{min}$, and to save $\overline{\psi}_{max}$ into said register group;

said comparing and selecting module is configured to obtain $\psi_{max}$ and $\overline{\psi}_{max}$ from said register group, to compare $\psi_{max}$ and $\overline{\psi}_{max}$, and to output a control signal contr operating to control said register group, and an address of a constellation matrix corresponding to a greater one of $\psi_{max}$ and $\overline{\psi}_{max}$ in said read-only memory module to said read-only memory module;

said register group is configured to save $\psi_{max}$, $\psi_{min}$, i1, and j1 from said extreme-value-calculating module, and $\overline{\psi}_{max}$ from said maximum-calculating module, and to output an address of a constellation matrix corresponding to said greater one of $\psi_{max}$ and $\overline{\psi}_{max}$ in said read-only memory module to said read-only memory module according to said control signal contr output by said comparing and selecting module, whereby controlling said read-only memory module to output a demodulated constellation matrix to said output buffer; and said output buffer is configured to receive and buffer said demodulated constellation matrix $\hat{\Phi}$ from said read-only memory module.

3. The antipodal demodulator of claim 2, wherein said read-only memory module is configured to save said two sub-constellations $$C_1 = \{\Phi_l\}_{l=1}^{L/2}$$

and $$\overline{C}_1 = \{\overline{\Phi}_l\}_{l=1}^{L/2}$$

of said antipode-based unitary space-time constellation, there is no antipode pair in each sub-constellation, and there is one-to-one correspondence between two antipodes in different sub-constellations, said read-only memory module is configured to output L/2 constellation matrices in said sub-constellation $$C_1 = \{\Phi_l\}_{l=1}^{L/2}$$

to said trace-calculating module, to receive said address from said register group indicating a corresponding constellation matrix in said read-only memory module is said demodulated constellation matrix $\hat{\Phi}$, and to output $\hat{\Phi}$ to said output buffer.

4. The antipodal demodulator of claim 2, wherein said extreme-value-calculating module is configured to receive L/2 traces $\psi_l$ of matrices $Y^H \Phi_l \Phi_l^H Y$ output by $\psi_l$ computing units in said trace-calculating module, to determine a maximum trace $\psi_{max}$ and a minimum trace $\psi_{min}$ therefrom, to output said maximum trace $\psi_{max}$ and said minimum trace $\psi_{min}$ to said register group, and to output said address i1 of said constellation matrix $\Phi_i$ corresponding to said maximum trace $\psi_{max}$ in said read-only memory module, and said address j1 of said antipode matrix $\overline{\Phi}_j$ corresponding to said minimum value $\psi_{min}$ and antipodal to said constellation matrix $\Phi_j$ in another sub-constellation $$\overline{C}_1 = \{\overline{\Phi}_l\}_{l=1}^{L/2}$$

in said read-only memory module into said register group, where $1 \le l \le L/2$.

5. The antipodal demodulator of claim 2, wherein said maximum-calculating module is configured to receive said trace $\sigma$ of said matrix $Y^H Y$ from $\sigma$ computing unit in said trace-calculating module, to obtain said minimum trace $\psi_{min}$ from said register group, to calculate $\overline{\psi}_{max} = \sigma - \psi_{min}$, and to output $\overline{\psi}_{max}$ to said register group.

6. The antipodal demodulator of claim 2, wherein said register group is configured to receive and to save $\psi_{max}$ and $\psi_{min}$ from said extreme-value-calculating module, and said address i1 of said constellation matrix $\Phi_i$ corresponding to said maximum trace $\psi_{max}$ in said read-only memory module, and said address j1 of said antipode matrix $\overline{\Phi}_j$ corresponding to said minimum value $\psi_{min}$ and antipodal to said constellation matrix $\Phi_j$ in another sub-constellation $$\overline{C}_1 = \{\overline{\Phi}_l\}_{l=1}^{L/2} \qquad 5$$

in said read-only memory module, to output $\psi_{min}$ to said maximum-calculating module, to receive and save $\overline{\psi}_{max}$ from said maximum-calculating module, and to output $\psi_{max}$ and $\overline{\psi}_{max}$ to said comparing and selecting module.

7. The antipodal demodulator of claim 2, wherein said comparing and selecting module is configured to compare $\psi_{max}$ with $\overline{\psi}_{max}$, and to output said control signal contr operating to control said register group to said register group so that said register group transmits said address i1 of said constellation matrix $\Phi_i$ corresponding to said maximum trace $\psi_{max}$ in said read-only memory module to said read-only memory module if $\psi_{max} > \overline{\psi}_{max}$, and transmits said address j1 of said constellation matrix $\overline{\Phi}_j$ corresponding to said maximum trace $\overline{\psi}_{max}$ in said read-only memory module to said read-only memory module if $\psi_{max} < \overline{\psi}_{max}$.

\* \* \* \* \*